United States Patent
Galinski

(10) Patent No.: US 7,170,264 B1
(45) Date of Patent: Jan. 30, 2007

(54) FREQUENCY COMPENSATION SCHEME FOR A SWITCHING REGULATOR USING EXTERNAL ZERO

(75) Inventor: Martin F. Galinski, Santa Clara, CA (US)

(73) Assignee: Micrel, Inc., San Jose, CA (US)

( * ) Notice: Subject to any disclaimer, the term of this patent is extended or adjusted under 35 U.S.C. 154(b) by 0 days.

(21) Appl. No.: 11/456,432

(22) Filed: Jul. 10, 2006

(51) Int. Cl.
*G05F 1/10* (2006.01)
*G05F 1/652* (2006.01)

(52) U.S. Cl. ................. 323/222; 323/282; 323/284
(58) Field of Classification Search ........... 323/222, 323/282, 284, 285
See application file for complete search history.

(56) References Cited

U.S. PATENT DOCUMENTS

| | | | | |
|---|---|---|---|---|
| 5,617,306 A | * | 4/1997 | Lai et al. | 363/17 |
| 5,850,139 A | * | 12/1998 | Edwards | 323/280 |
| 5,889,393 A | * | 3/1999 | Wrathall | 323/282 |
| 6,531,854 B2 | * | 3/2003 | Hwang | 323/285 |
| 6,737,841 B2 | * | 5/2004 | Wrathall | 323/282 |
| 6,828,766 B2 | * | 12/2004 | Corva et al. | 323/284 |
| 6,885,176 B2 | * | 4/2005 | Librizzi | 323/285 |
| 6,894,471 B2 | * | 5/2005 | Corva et al. | 323/282 |
| 6,963,190 B2 | * | 11/2005 | Asanuma et al. | 323/283 |

* cited by examiner

*Primary Examiner*—Bao Q. Vu
(74) *Attorney, Agent, or Firm*—Patent Law Group LLP; Carmen C. Cook

(57) ABSTRACT

A compensation circuit in a monolithic switching regulator controller being incorporated in a closed loop feedback system of a switching regulator includes an amplifier configured in a unity gain feedback configuration with a first resistor and including a non-inverting input terminal receiving the feedback voltage and an inverting input terminal coupled to a first terminal of the switching regulator controller. The compensation circuit further includes a first capacitor and a third resistor connected in series between an input terminal and an output terminal of an error amplifier of the switching regulator controller. The first capacitor and the third resistor introduce a first zero in the closed loop feedback system. When a second capacitor is coupled to the first terminal of the switching regulator controller, a second zero is introduced in the closed loop feedback system. The second capacitor is an off-chip capacitor formed external to the monolithic switching regulator controller.

20 Claims, 6 Drawing Sheets

US 7,170,264 B1

FREQUENCY COMPENSATION SCHEME FOR A SWITCHING REGULATOR USING EXTERNAL ZERO

FIELD OF THE INVENTION

The invention relates to a circuit and method for providing zero compensation to a linear integrated circuit, in particular, to a circuit and method for providing compensation in a switching regulator feedback loop using an external zero.

DESCRIPTION OF THE RELATED ART

Closed loop negative feedback systems are commonly employed in linear integrated circuits. For instance, switching regulators use a feedback loop to monitor the output voltage in order to provide regulation. To ensure stability in any closed loop system, the Nyquist criterion must be met. The Nyquist criterion states that a closed loop system is stable if the phase shift around the loop is less than 180 degrees at unity gain. Typically, a compensation circuit is added to a feedback loop to modulate the phase shift of the feedback loop to obtain stability.

The frequency response of a linear circuit can be characterized by the presence of "poles" and "zeros." A "pole" is a mathematical term which signifies the complex frequency at which gain reduction begins. On the other hand, a "zero" signifies the complex frequency at which gain increase starts. Poles and zeros on the left half plane of a complex frequency plane or s-plane are considered normal and can be compensated. However, poles and zeros on the right half plane of a complex frequency plane are usually problematic and difficult to manipulate and is not addressed in the present application. Generally, a pole contributes a −90° phase shift while a zero contributes a +90° phase shift. A pole cancels out the phase shift of a zero for zeros in the left half plane. In designing a closed loop system with compensation, the location of the poles and zeros are manipulated so as to avoid a greater than 180° phase shift at unity gain.

In a linear circuit, poles are created by placing a small capacitor on a node with a high dynamic impedance. If the capacitor is placed at a gain stage, the capacitance can be multiplied by the gain of the stage to increase its effectiveness. Each pole has a zero associated with it. That is, at some point, the dynamic resistance of the gain stage will limit the gain loss capable of being achieved by the capacitor. Thus, a zero can be created by placing a resistor in series with the gain reduction capacitor.

A conventional voltage mode switching regulator uses an inductor-capacitor (LC) network at the voltage output terminal for filtering the regulated output voltage to produce a relatively constant DC output voltage. FIG. 1 is a schematic diagram of a conventional switching regulator including a switching regulator controller 10 and an LC circuit 11. Switching regulator controller 10 generates a switching output voltage $V_{SW}$ at an output terminal 13 which is coupled to LC circuit 11 for providing a regulated output voltage $V_{OUT}$. The regulated output voltage $V_{OUT}$ is coupled back to controller 10 at a feedback (FB) terminal 15 for forming a feedback control loop. The LC circuit has associated with it two poles, one pole associated with each element. If the feedback control loop is not compensated, LC circuit 11 alone contributes an −180° phase shift to the system and loop instability results, causing the output voltage to oscillate. Because virtually every switching regulator uses an LC filter circuit to filter the switching output voltage $V_{SW}$, compensation must be provided in the feedback control loop of the switching regulator to compensate for the effect of the two poles introduced by the LC circuit.

A commonly employed compensation scheme employed in switching regulators is referred to as Type III compensation. The Type III compensation scheme shapes the profile of the gain with respect to frequency using two zeroes to give a phase boost of 180°. The phase boost therefore counteracts the effects of the underdamped resonance at the double pole of the output LC filter, thereby ensuring closed loop stability.

FIG. 1 illustrates one approach for providing compensation in a feedback control loop of a switching regulator. Referring to FIG. 1, the output voltage $V_{OUT}$ is coupled to the feedback (FB) terminal 15 through a parallel combination of a capacitor $C_{zero}$ and a resistor $R_{IN}$. In some applications, a voltage divider may be provided to step down the output voltage $V_{OUT}$ before the output voltage is fed back to the FB terminal. The feedback voltage $V_{FB}$ is further coupled through a series combination of a resistor $R_f$ and a capacitor $C_{pole}$ to a COMP terminal 17. COMP terminal 17 is connected to the output of the error amplifier 20 comparing the feedback voltage $V_{FB}$ to a reference voltage.

The operation of the feedback control loop in controller 10 is well known in the art. The output voltage $V_{OUT}$ is fed back as feedback voltage $V_{FB}$ to error amplifier 20 which compares the feedback voltage $V_{FB}$ to a reference voltage $V_{REF}$. Error amplifier 20 generates an error output signal indicative of the difference between voltage $V_{FB}$ and reference voltage $V_{REF}$. The error output signal is then coupled to a comparator and other control logic to generate the drive signals for a pair of power switches. The feedback control loop of controller 10 operates to regulate the output voltage $V_{OUT}$ based on the error output of error amplifier 20 so that voltage $V_{FB}$ equals voltage $V_{REF}$.

In the switching regulator of FIG. 1, capacitor $C_{zero}$ is connected in parallel to resistor $R_{IN}$ and capacitor $C_{pole}$ is connected in series with resistor $R_f$ to provide compensation to the feedback loop. Capacitor $C_{pole}$ and resistor $R_f$ introduce a first zero in the feedback while capacitor $C_{zero}$ and resistor $R_{IN}$ introduces a second zero-pole pair in the feedback loop. The locations (or frequencies) of the first and second zeroes are determined by the respective resistance and the capacitance values.

FIG. 2 is a plot of the loop gain magnitude vs. frequency in log scale for the switching regulator of FIG. 1. The low frequency loop gain is first reduced by a dominant pole associated with capacitor $C_{pole}$ and resistor $R_{IN}$. The gain loss is modified by the first zero also associated with capacitor $C_{pole}$ and resistor $R_f$ to form a midband gain region. Then, at high frequency, the second zero associated with capacitor $C_{zero}$ and resistor $R_{IN}$ becomes effective to increase the gain until the effect of the double-pole in the LC filter circuit causes a large loss in the loop gain. The operation of the second capacitor $C_{zero}$ ensures that the phase shift of the feedback loop is less than 180° near unity gain.

The Type III compensation scheme for a switching regulator can be provided on-chip or off-chip. When external compensation (off-chip) is used, it is often very difficult for users of the switching regulator to determine the optimal capacitance and resistance values for capacitors $C_{pole}$ and $C_{zero}$ and resistors $R_{IN}$ and $R_f$ in order to support a large range of output LC filter circuit values. The transfer function to determine the capacitance and resistance values is often very complex. When internal compensation (on-chip) is used, the range of output LC filter values is limited because the locations of the zero compensation are fixed by the on-chip compensation circuit. The LC filter circuit must conform to the limited range of inductance and capacitance values or the feedback loop will become unstable.

Thus, it is desirable to provide a compensation circuit in a feedback loop of a switching regulator that is capable of providing effective pole cancellation and zero compensation while being simple to implement.

SUMMARY OF THE INVENTION

According to one embodiment of the present invention, a compensation circuit in a monolithic switching regulator controller being incorporated in a closed loop feedback system of a switching regulator is described. The switching regulator controller includes an input terminal receiving an input voltage, an output terminal providing a switching output voltage corresponding to a regulated output voltage, a feedback terminal for receiving a feedback voltage corresponding to the regulated output voltage, and an error amplifier comparing a signal indicative of the feedback voltage and a reference voltage and generating an error output voltage. The compensation circuit includes an amplifier including a non-inverting input terminal coupled to the feedback terminal for receiving the feedback voltage, an inverting input terminal coupled to a first terminal of the switching regulator controller, and an output terminal; a first resistor connected between the inverting input terminal and the output terminal of the amplifier; a second resistor connected between the output terminal of the amplifier and a first input terminal of the error amplifier where the first input terminal receiving the signal indicative of the feedback voltage; and a first capacitor and a third resistor connected in series between the first input terminal and an output terminal of the error amplifier where the output terminal of the error amplifier providing the error output voltage. The first capacitor and the third resistor operate to introduce a first zero in the closed loop feedback system.

In another embodiment, a second capacitor is to be coupled to the first terminal of the switching regulator controller to introduce a second zero in the closed loop feedback system. The second capacitor is an off-chip capacitor formed external to the monolithic switching regulator controller.

According to another aspect of the present invention, a method for providing zero compensation in a monolithic switching regulator controller being incorporated in a closed loop feedback system of a switching regulator receiving an input voltage and providing a regulated output voltage includes providing an amplifier in the switching regulator controller configured in a unity gain configuration including a first resistor connected between an inverting input terminal and an output terminal of the amplifier; receiving a feedback voltage at a non-inverting input terminal of the amplifier where the feedback voltage corresponding to the regulated output voltage; providing a second resistor between the output terminal of the amplifier and a first input terminal of an error amplifier of the switching regulator controller where the first input terminal of the error amplifier receiving a signal indicative of the feedback voltage; and providing a first capacitor and a third resistor connected between the first input terminal and an output terminal of the error amplifier. The first capacitor and the third resistor introduce a first zero in the closed loop feedback system of the switching regulator.

In another embodiment, the method further includes coupling the inverting input terminal of the amplifier to a first terminal of the switching regulator controller; and coupling a second capacitor to the first terminal of the switching regulator controller to introduce a second zero in the closed loop feedback system. The second capacitor is an off-chip capacitor formed external to the monolithic switching regulator controller.

The present invention is better understood upon consideration of the detailed description below and the accompanying drawings.

DETAILED DESCRIPTION OF THE PREFERRED EMBODIMENTS

In accordance with the principles of the present invention, a zero compensation scheme for implementing type III compensation in a switching regulator includes an on-chip compensation circuit which can be coupled to an off-chip zero capacitor for providing frequency compensation to improve close loop stability. The on-chip compensation circuit includes an RC network for introducing a first zero and an amplifier receiving the feedback voltage on its non-inverting input terminal. An external zero capacitor is coupled to the inverting input terminal of the amplifier to establish a second zero for the feedback loop. In this manner, a simple type III compensation scheme is realized where the location of the first zero is fixed on-chip and the location of the second zero is varied by selecting a single external component—the zero capacitor.

In another embodiment, the zero compensation scheme of the present invention is applied to implement type II compensation by not using the off-chip zero capacitor. The amplifier of the on-chip compensation circuit becomes a unity gain amplifier with its inverting input terminal left uncoupled off-chip but configured in a negative feedback loop on-chip. A simple type II compensation is thus realized where the internal zero provides the necessary compensation for frequency stability.

The zero compensation scheme of the present invention has many advantages. First, the zero compensation scheme is simple for the user to implement as the user only needs to select a single component value—the zero capacitor—to realize effective Type III compensation. Second, by allowing the location of the second zero to be established through an external component, the compensation scheme allows for a wide range of inductor and capacitor values to be selected for the output filter circuit of the switching regulator. In general, the zero compensation scheme of the present invention provides a simplified approach for close loop compensation while providing flexibility for selecting inductance and capacitance values for the output filter circuit. The zero compensation scheme of the present invention can be effectively applied in switching voltage regulators and other closed loop feedback systems with multiple poles for introducing effective "zero" compensation and improving frequency stability.

In the present description, a "zero" and a "pole" have meanings well understood by one skilled in the art. Specifically, a "zero" refers to the complex frequency at which the frequency response of a linear circuit has a zero amplitude, and a "pole" refers to the complex frequency at which the frequency response of a linear circuit has an infinite amplitude. In a feedback system, a pole signifies the frequency at which gain reduction begins while a zero signifies the frequency at which gain increase starts.

Figure 3:
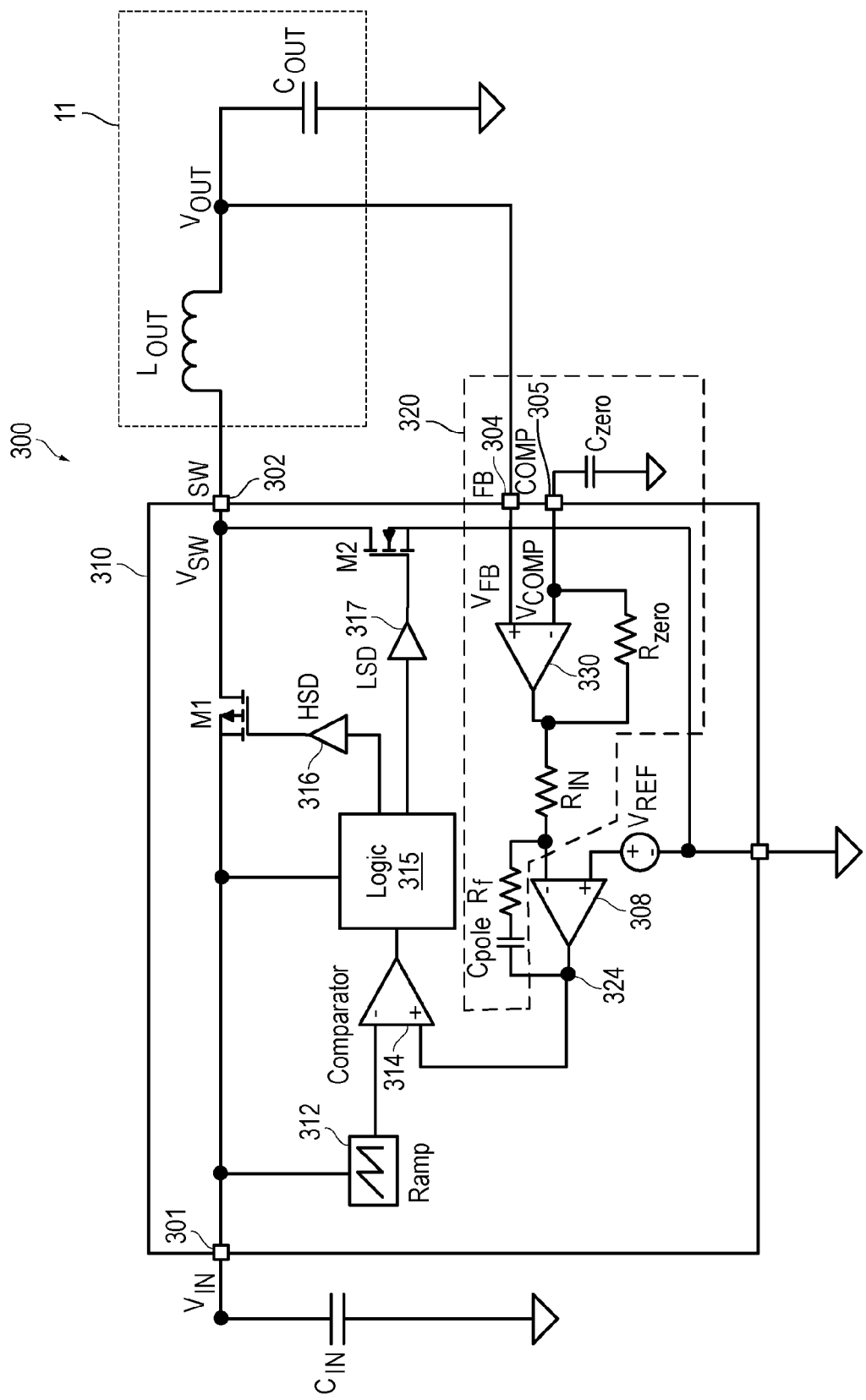
FIG. 3 is a schematic diagram of a switching regulator including a monolithic switching regulator controller implementing the zero compensation scheme according to one embodiment of the present invention.

FIG. 3 is a schematic diagram of a switching regulator including a monolithic switching regulator controller implementing the zero compensation scheme according to one embodiment of the present invention. Referring to FIG. 3, a switching regulator 300 includes a monolithic switching regulator controller 310, an input capacitor $C_{IN}$ and an output LC filter circuit 11. Switching regulator controller 310 is formed on a single integrated circuit and the input capacitor and the output LC filter circuit are formed external to the integrated circuit. The circuitry of switching regulator controller 310 is conventional except for the zero compensation circuit 320. Switching regulator controller 310 receives an input voltage $V_{IN}$ provided on an input terminal 301 and generates a switching output voltage $V_{SW}$ on an output terminal (SW) 302. The switching output voltage $V_{SW}$ is coupled to an LC filter circuit 11 to generate an output voltage $V_{OUT}$ having substantially constant magnitude.

Switching regulator 300, constructed using controller 310 and LC circuit 11, forms a closed loop feedback system for switching output voltage $V_{SW}$ and consequently, the regulated output voltage $V_{OUT}$. The output voltage $V_{OUT}$ from LC filter circuit 11 is fed back to controller 310 on a feedback terminal 304. In some applications, the output voltage $V_{OUT}$ may be coupled to a voltage divider to generate a stepped-down feedback voltage to be fed back to the feedback terminal. Alternately, the output voltage $V_{OUT}$ can be fed back to controller 310 and then stepped down by an on-chip voltage divider formed in the controller integrated circuit. The use of external (off-chip) or internal (on-chip) voltage dividers to step down the fed-back output voltage $V_{OUT}$ where needed is well known in the art. Thus, the feedback voltage $V_{FB}$ can be the output voltage $V_{OUT}$ or a stepped-down version of the output voltage $V_{OUT}$.

The feedback voltage $V_{FB}$ is coupled through zero compensation circuit 320 to the control circuitry of controller 310. In FIG. 3, the control circuitry of controller 310 is illustrated as including an error amplifier 308 receiving the feedback voltage $V_{FB}$ on an inverting input terminal and a reference voltage $V_{REF}$ on the non-inverting input terminal. Error amplifier 308 generates an error output voltage on an output terminal 324. The error output voltage is coupled to a comparator 314 to be compared with a ramp voltage generated by a PWM ramp generator 312. The output of comparator 314 is coupled to drive a logic circuit 315 to generate the control signals for driving the switching transistors M1 and M2. Specifically, logic circuit 315 provides a control signal to drive a high-side driver (HSD) 316 which in turn drives a PMOS power transistor M1. Logic circuit 315 also provides a control signal to drive a low-side driver (LSD) 317 which in turn drives an NMOS power transistor M2. The schematic diagram of FIG. 3 is simplified to better illustrate the principles of the present invention. It is understood by one skilled in the art that, in actual implementation, switching regulator controller 310 may include additional terminals and circuitry for the specific application.

In the present embodiment, a zero compensation circuit 320 is incorporated in controller 310 to introduce an internal (on-chip) zero and an external (off-chip) zero to the feedback loop of switching regulator 300. In this manner, the zero compensation circuit of the present invention functions to ensure that the feedback system of the switching regulator meets the Nyquist criterion for frequency stability.

Zero compensation circuit 320 includes an amplifier 330 configured in a unity gain configuration with a resistor $R_{zero}$ connected between the inverting input terminal and the output terminal of amplifier. The non-inverting input terminal of amplifier 330 is coupled to the feedback (FB) terminal 304 to receive the feedback voltage $V_{FB}$. The inverting input terminal of amplifier 330 is coupled to a compensation (COMP) terminal 305 to which a zero capacitor $C_{zero}$, external to the switching regulator controller integrated circuit, can be coupled. Resistor $R_{zero}$, coupled between the inverting input terminal and the output terminal of amplifier 330, completes the feedback loop. In the present embodiment, a zero capacitor $C_{zero}$ is connected between the COMP terminal 305 and the ground potential to introduce a zero to the feedback loop of the switching regulator 300.

Zero compensation circuit 320 further includes a resistor $R_{IN}$ coupled between the output terminal of amplifier 330 and the inverting input terminal of error amplifier 308, a resistor $R_f$ and a capacitor $C_{pole}$ connected in series between the inverting input terminal and the output terminal of error amplifier 308. By the negative feedback connection of resistor $R_f$ and a capacitor $C_{pole}$, zero compensation circuit 320 introduces another zero to the feedback loop of switching regulator 300.

In the feedback loop of switching regulator 300, the LC filter circuit 11 introduces two poles to the feedback loop which needs to be compensated. The compensation scheme of the present invention provides a first zero which is formed internal (on-chip) of the switching regulator controller integrated circuit and a second zero which is formed external (off-chip) to the switching regulator controller integrated circuit. More specifically, the input resistor $R_{IN}$ and the feedback capacitor $C_{pole}$ introduce a dominant pole at error amplifier 308. Capacitor $C_{pole}$ and resistor $R_f$ introduces the first zero at the error amplifier 308. The locations of the dominant pole and the first zero are thereby fixed by nature of the capacitor and resistors being formed as part of the controller integrated circuit. The second zero is introduced to the feedback loop by coupling an off-chip zero capacitor $C_{zero}$ to the COMP input terminal 305. The location of the second zero can thus be modified by selecting the appropriate capacitance value for the zero capacitor $C_{zero}$.

Figure 1:
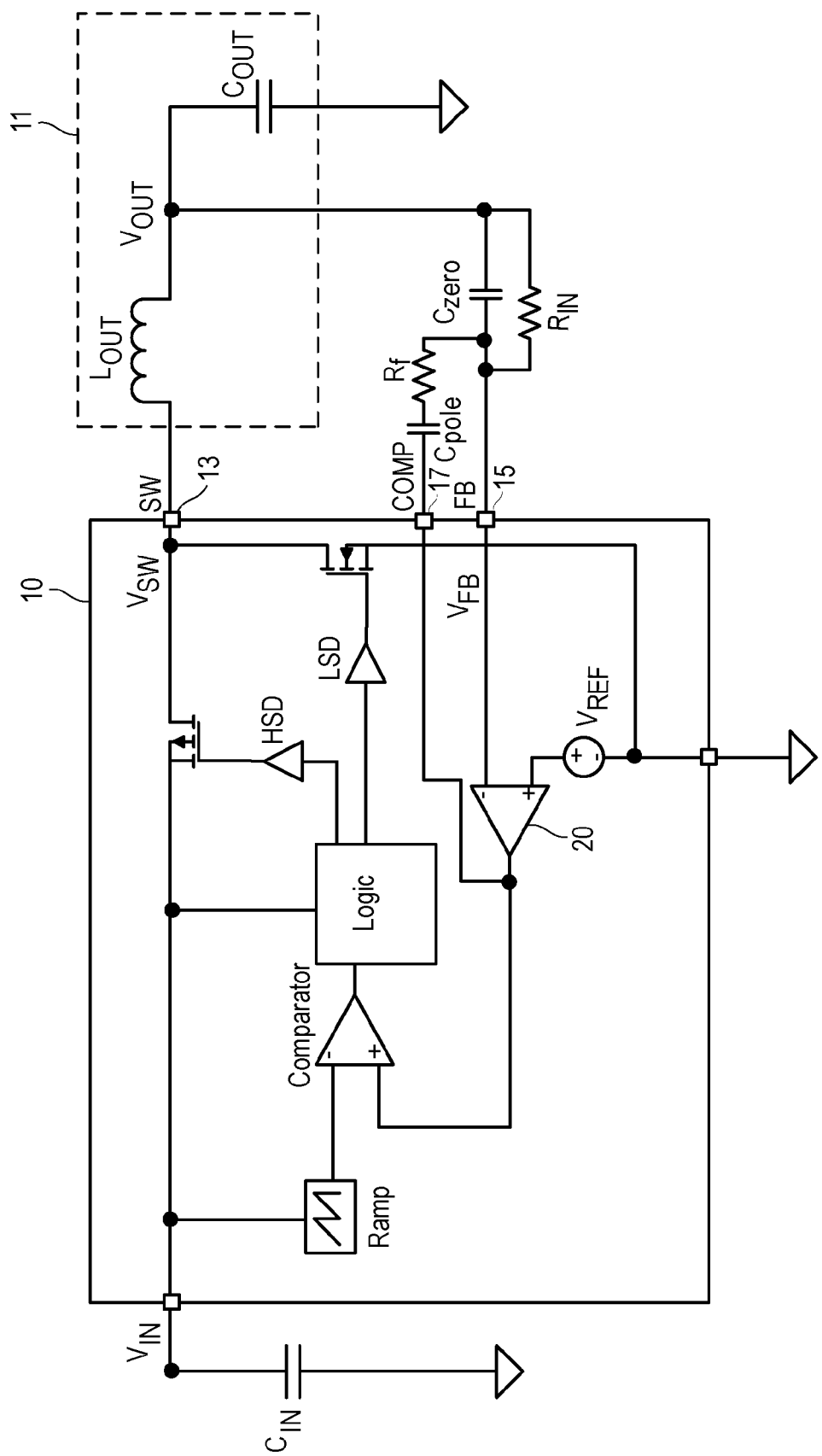
FIG. 1 illustrates one approach for providing compensation in a feedback control loop of a switching regulator.
Figure 2:
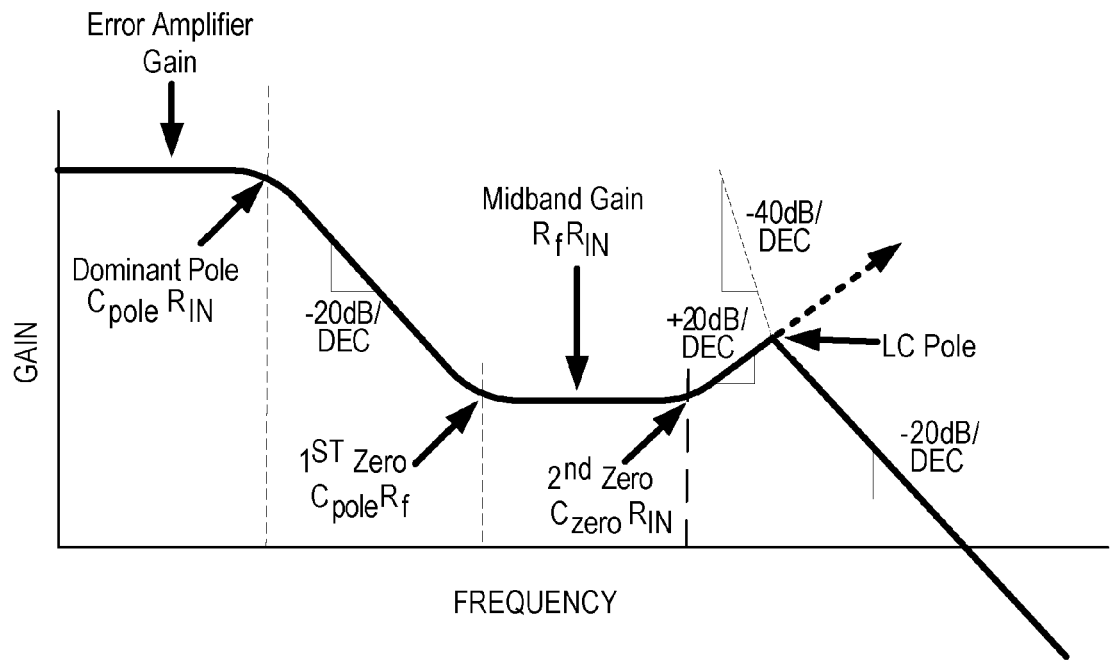
FIG. 2 is a plot of the loop gain magnitude vs. frequency in log scale for the switching regulator of FIG. 1.
Figure 4:
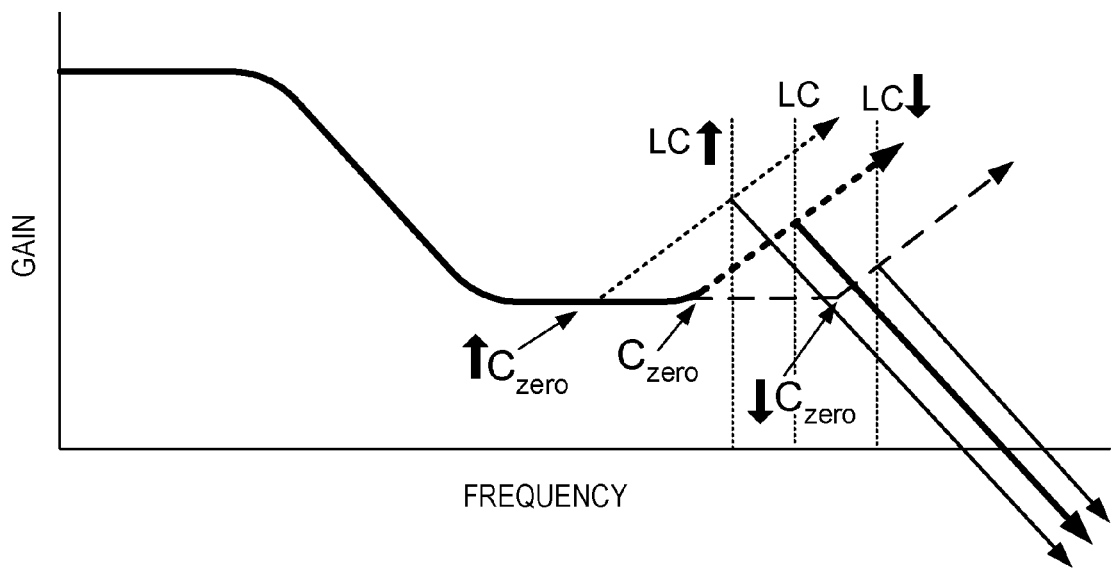
FIG. 4 is a loop gain vs. frequency plot for the feedback system of the switching regulator in FIG. 3.

FIG. 4 is a loop gain vs. frequency plot for the feedback system of the switching regulator in FIG. 3. The loop gain vs. frequency plot of FIG. 4 is similar to that of FIG. 2 in that the low frequency loop gain is first reduced by a dominant pole associated with capacitor $C_{pole}$ and resistor $R_{IN}$ and then the gain loss is modified by the first zero also associated with capacitor $C_{pole}$ and resistor $R_f$ to form a midband gain region. Then, as shown in FIG. 4, the location of the second zero associated with zero capacitor $C_{zero}$ and resistor $R_{IN}$ can be modified by changing the capacitance value of the externally coupled zero capacitor $C_{zero}$. In this manner, the location of the second zero can be changed to accommodate different inductor and capacitor values used for the LC filter circuit. For instance, when larger inductor and capacitor values are used for the LC filter circuit, a larger zero capacitor $C_{zero}$ can be used to decrease the second zero frequency. On the other hand, when smaller inductor and capacitor values are used for the LC filter circuit, a smaller zero capacitor $C_{zero}$ can be used to increase the second zero frequency accordingly so that close loop stability is maintained. Thus, a user only needs to select one component value—the zero capacitor $C_{zero}$—to realize effective compensation of the switching regulator for a wide range of inductor and capacitor values used for the LC filter circuit.

In accordance with the compensation scheme of the present invention, the compensation circuit couples the zero capacitor $C_{zero}$ through amplifier 330 to incorporate the external zero in the feedback loop. Coupling zero capacitor $C_{zero}$ through amplifier 330 enables the use of a zero capacitor $C_{zero}$ with practical capacitance value. If amplifier 330 is not included, zero capacitor $C_{zero}$ will need to have very small capacitance values close to the level of the parasitic capacitance that is usually present at the input-output terminals of an integrated circuit, rendering the compensation scheme impractical to implement. In one embodiment, capacitance $C_{pole}$ is 20 pf and resistors $R_f$ and $R_{IN}$ have large resistance values, around 90 kohms. Resistor $R_{zero}$ is 10 kohms and zero capacitor can be 100 pf to 1000 pf. By allowing a large capacitance value to be used as zero capacitor $C_{zero}$, the user of switching regulator 300 is provided with more control over the capacitance value of zero capacitor $C_{zero}$ and therefore the user has effective control over the location of the second zero in the feedback loop.

In some applications, the output capacitor $C_{OUT}$ used in the LC filter circuit has a low equivalent series resistance (ESR). For example, a ceramic capacitor may be used to form the output capacitor $C_{OUT}$. In that case, Type III compensation requiring first and second zeroes is necessary to compensate for the double pole of the LC filter circuit. The zero compensation scheme described with reference to FIG. 3 utilizes an off-chip zero capacitor to introduce a second zero with selectable frequency location to realize a Type III compensation scheme. However, in some other applications, a capacitor with a high ESR may be used as the output capacitor $C_{OUT}$. For example, a tantalum or electrolytic capacitor may be used and such capacitors have appreciable ESR. When the output capacitor $C_{OUT}$ has a high ESR, the resistance in the output capacitor introduces a zero itself so that the switching regulator requires only type II compensation to achieve frequency stability.

Figure 5:
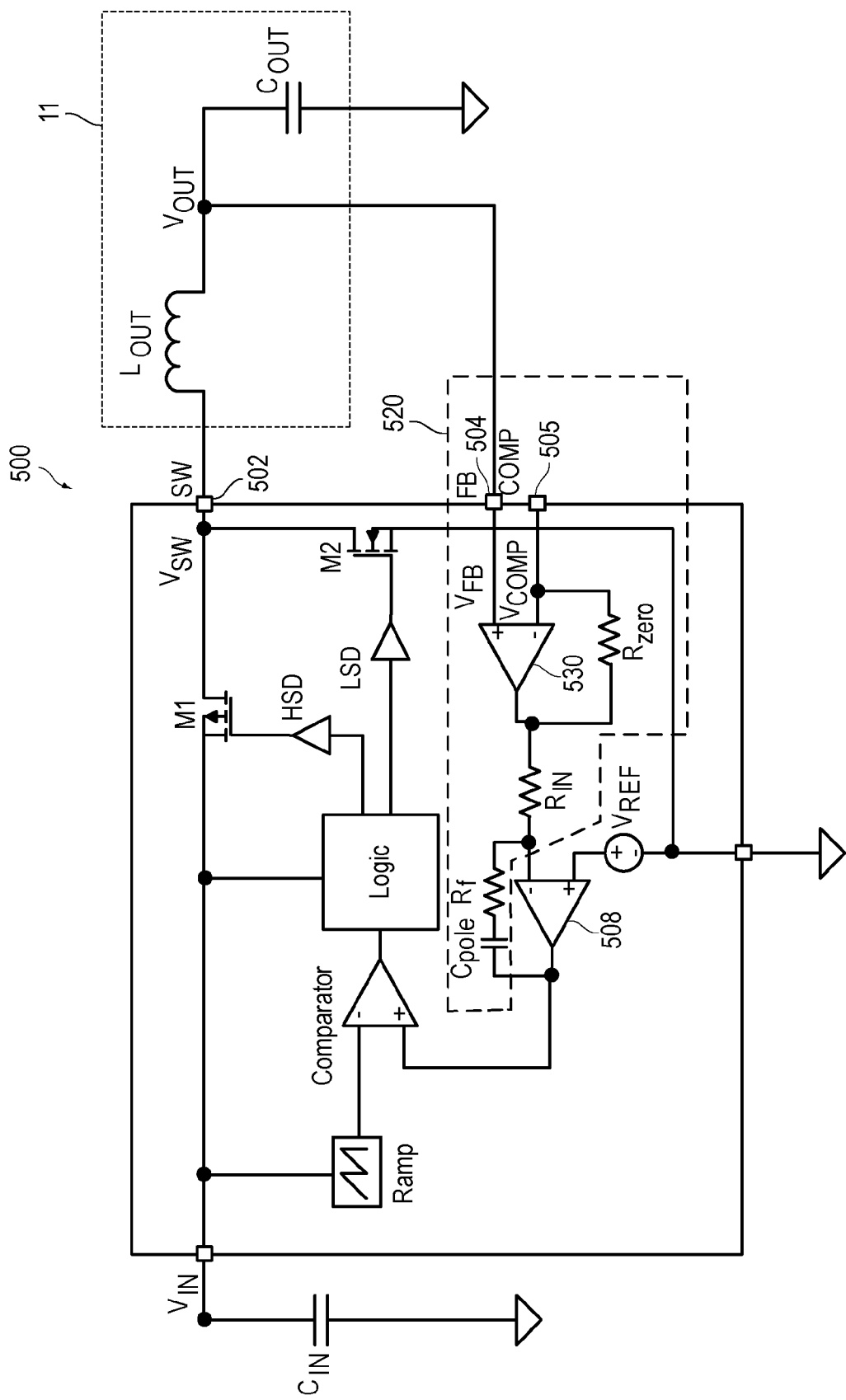
FIG. 5 is a schematic diagram of a switching regulator including a monolithic switching regulator controller implementing the zero compensation scheme according to a second embodiment of the present invention.

According to another aspect of the present invention, the zero compensation scheme of the present invention is applied in a switching regulator to implement type II compensation. FIG. 5 is a schematic diagram of a switching regulator including a monolithic switching regulator controller implementing the zero compensation scheme according to a second embodiment of the present invention. In the embodiment shown in FIG. 5, the output capacitor $C_{OUT}$ of switching regulator 500 is implemented using a high ESR capacitor, such as a tantalum or electrolytic capacitor. Because of the high ESR, the output capacitor $C_{OUT}$ provides a zero itself to the feedback loop. Therefore, the switching regulator 500 requires only one additional zero. The zero compensation circuit 520 of the present invention can thus be utilized by leaving the COMP input terminal unconnected. That is, no external zero capacitor needs to be connected to the COMP input terminal of zero compensation circuit 520. Zero compensation circuit 520 provides an internal (on-chip) zero to the feedback loop through capacitor $C_{pole}$ and resistor $R_f$.

When the COMP pin is left floating, the inverting input terminal of amplifier 530 is connected to the output terminal of the amplifier in a negative feedback configuration. Amplifier 530 operates as a unity gain opamp (operational amplifier) and the signal $V_{FB}$ at the feedback terminal FB 504 appears at the output terminal of amplifier 530. Thus, the presence of amplifier 530 does not affect the operation of the switching regulator 500.

Figure 6:
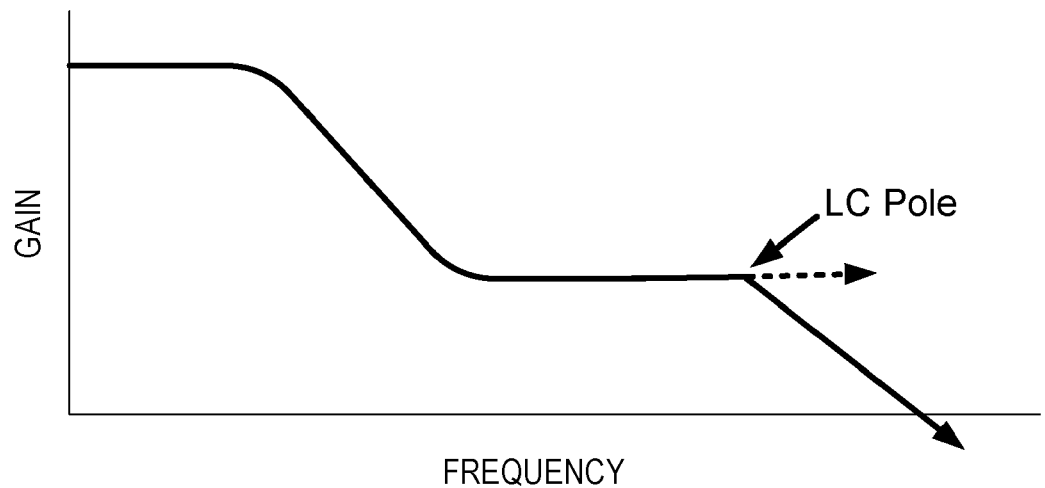
FIG. 6 is a loop gain vs. frequency plot for the feedback system of the switching regulator in FIG. 5.

FIG. 6 is a loop gain vs. frequency plot for the feedback system of the switching regulator in FIG. 5. As shown in FIG. 6, the loop gain is reduced by dominant pole and is modified by the first zero at the midband gain region. Then, there is no second zero but instead the loop gain is reduced by the double pole of the output filter circuit. Because the output capacitor $C_{OUT}$ provides a zero, the slope of the LC double pole is tapered so that there is sufficient phase margin in the loop gain at unity gain.

Figure 7:
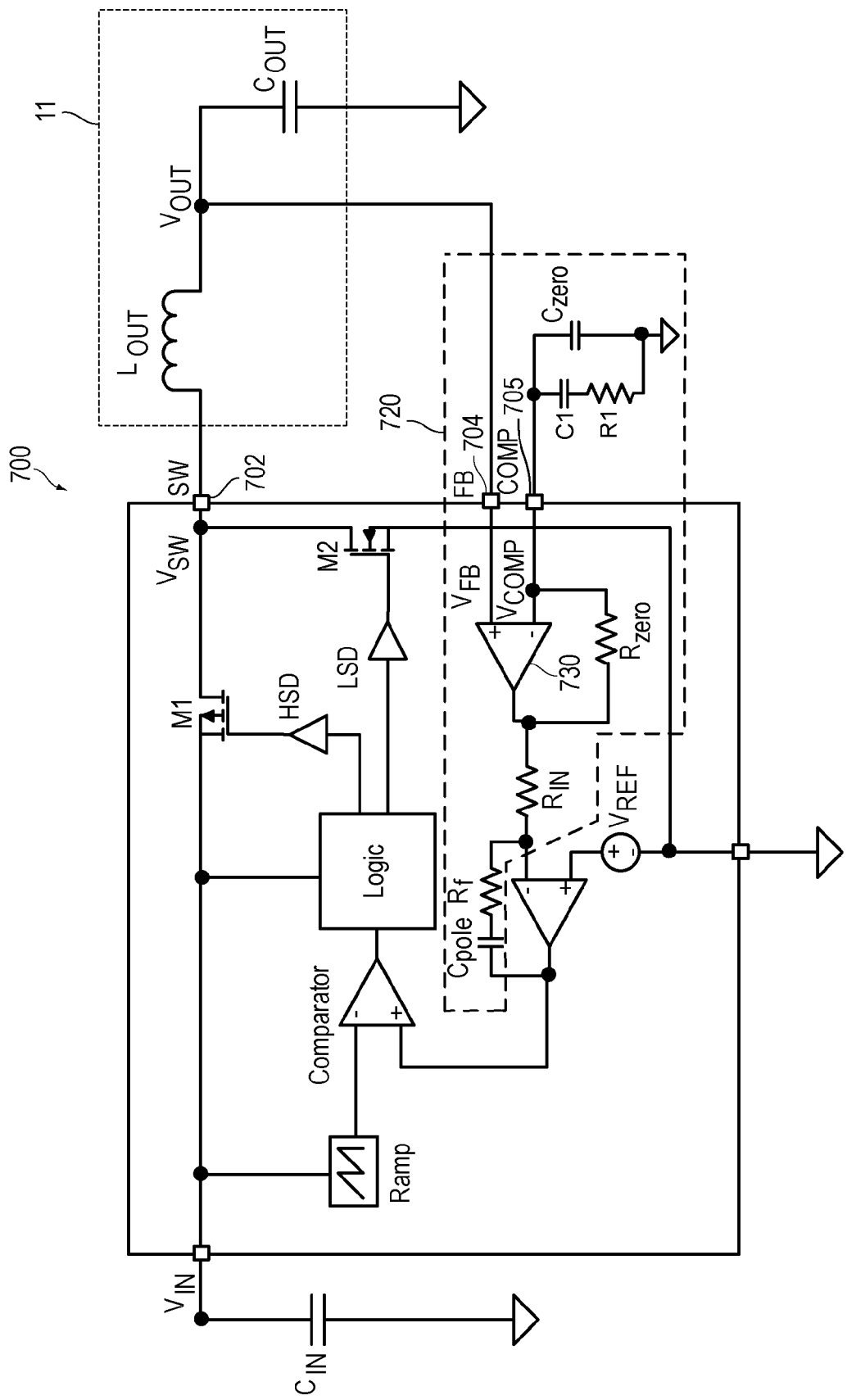
FIG. 7 is a schematic diagram of a switching regulator including a monolithic switching regulator controller implementing the zero compensation scheme according to a third embodiment of the present invention.

According to yet another aspect of the present invention, an external (off-chip) RC network can be coupled in parallel with the off-chip zero capacitor to modify the loop gain, in particular the mid-band gain, of the feedback loop of the switching regulator. FIG. 7 is a schematic diagram of a switching regulator including a monolithic switching regulator controller implementing the zero compensation scheme according to a third embodiment of the present invention. Switching regulator 700 in FIG. 7 incorporates a zero compensation circuit in the same manner as switching regulator 300 of FIG. 3 and like elements in FIGS. 3 and 7 are given like reference numerals to simplify the discussion.

In switching regulator 700, the zero compensation circuit 720 includes a zero capacitor $C_{zero}$ coupled to the COMP input terminal 705 which connects to the inverting input terminal of amplifier 730. Zero capacitor $C_{zero}$ provides an external zero to the feedback loop. Furthermore, an RC network, including a serial connection of a capacitor C1 and a resistor R1, is coupled between the COMP input terminal 705 and the ground potential. Thus, the RC network is connected in parallel with zero capacitor $C_{zero}$. The RC network of capacitor C1 and resistor R1 operates to modify the loop gain of the feedback loop of switching regulator 700.

Figure 8:
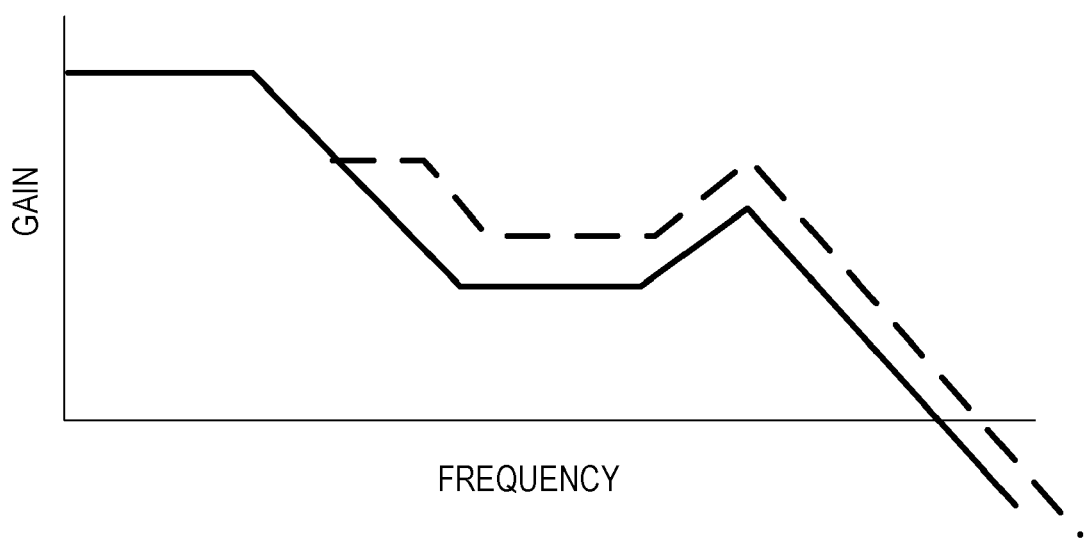
FIG. 8 is a loop gain vs. frequency plot for the feedback system of the switching regulator in FIG. 7.

More specifically, the RC network operates to modify the loop gain at a specific frequency location as determined by the resistance and capacitance values of resistor R1 and capacitor C1 in the RC network. FIG. 8 is a loop gain vs. frequency plot for the feedback system of the switching regulator in FIG. 7. As shown in FIG. 8, the addition of the RC network increases the loop gain around the midband region. In other embodiments, the RC network may include a single resistor to increase the entire loop gain of switching regulator.

The above detailed descriptions are provided to illustrate specific embodiments of the present invention and are not intended to be limiting. Numerous modifications and variations within the scope of the present invention are possible. The present invention is defined by the appended claims.

I claim:

1. A compensation circuit in a monolithic switching regulator controller being incorporated in a closed loop feedback system of a switching regulator, the switching regulator controller including an input terminal receiving an input voltage, an output terminal providing a switching output voltage corresponding to a regulated output voltage, a feedback terminal for receiving a feedback voltage corresponding to the regulated output voltage, and an error amplifier comparing a signal indicative of the feedback voltage and a reference voltage and generating an error output voltage, the compensation circuit comprising:

an amplifier including a non-inverting input terminal coupled to the feedback terminal for receiving the feedback voltage, an inverting input terminal coupled to a first terminal of the switching regulator controller, and an output terminal;

a first resistor connected between the inverting input terminal and the output terminal of the amplifier;

a second resistor connected between the output terminal of the amplifier and a first input terminal of the error amplifier, the first input terminal receiving the signal indicative of the feedback voltage; and a first capacitor and a third resistor connected in series between the first input terminal and an output terminal of the error amplifier, the output terminal of the error amplifier providing the error output voltage, wherein the first capacitor and the third resistor operate to introduce a first zero in the closed loop feedback system.

2. The compensation circuit of claim 1, wherein a second capacitor is to be coupled to the first terminal of the switching regulator controller to introduce a second zero in the closed loop feedback system, the second capacitor being an off-chip capacitor formed external to the monolithic switching regulator controller.

3. The compensation circuit of claim 1, wherein the output terminal of the switching regulator controller is coupled to an output filter circuit for generating the regulated output voltage, the output filter circuit comprising an inductor and a third capacitor connected in series between the output terminal of the switching regulator controller and a ground potential, wherein the third capacitor comprises a capacitor with a high equivalent series resistance (ESR).

4. The compensation circuit of claim 3, wherein the third capacitor comprises a tantalum capacitor or an electrolytic capacitor.

5. The compensation circuit of claim 2, wherein the output terminal of the switching regulator controller is coupled to an output filter circuit for generating the regulated output voltage, the output filter circuit comprising an inductor and a third capacitor connected in series between the output terminal of the switching regulator controller and a ground potential, wherein the third capacitor comprises a capacitor with a low equivalent series resistance (ESR).

6. The compensation circuit of claim 5, wherein the third capacitor comprises a ceramic capacitor.

7. The compensation circuit of claim 5, wherein the capacitance of the second capacitor is selected in accordance with the inductance of the inductor and the capacitance of the third capacitor of the output filter circuit.

8. The compensation circuit of claim 7, wherein when the inductance of the inductor and the capacitance of the third capacitor of the output filter circuit have large values, the capacitance of the second capacitor increases correspondingly to decrease the frequency of the second zero; and when the inductance of the inductor and the capacitance of the third capacitor of the output filter circuit have small values, the capacitance of the second capacitor decreases correspondingly to increase the frequency of the second zero.

9. The compensation circuit of claim 2, wherein a fourth resistor is to be coupled in parallel with the second capacitor to increase the gain of the closed loop feedback system.

10. The compensation circuit of claim 2, wherein a fourth capacitor and a fourth resistor, connected in series, are to be coupled in parallel with the second capacitor to increase the gain of the closed loop feedback system at a frequency determined by the capacitance of the fourth capacitor and the resistance of the fourth resistor.

11. A method for providing zero compensation in a monolithic switching regulator controller being incorporated in a closed loop feedback system of a switching regulator receiving an input voltage and providing a regulated output voltage, the method comprising:

providing an amplifier in the switching regulator controller configured in a unity gain configuration including a first resistor connected between an inverting input terminal and an output terminal of the amplifier;

receiving a feedback voltage at a non-inverting input terminal of the amplifier, the feedback voltage corresponding to the regulated output voltage;

providing a second resistor between the output terminal of the amplifier and a first input terminal of an error amplifier of the switching regulator controller, the first input terminal of the error amplifier receiving a signal indicative of the feedback voltage; and providing a first capacitor and a third resistor connected between the first input terminal and an output terminal of the error amplifier, the first capacitor and the third resistor introducing a first zero in the closed loop feedback system of the switching regulator.

12. The method of claim 11, further comprising:

coupling the inverting input terminal of the amplifier to a first terminal of the switching regulator controller; and coupling a second capacitor to the first terminal of the switching regulator controller to introduce a second zero in the closed loop feedback system, the second capacitor being an off-chip capacitor formed external to the monolithic switching regulator controller.

13. The method of claim 11, further comprising:

coupling an output filter circuit to the switching regulator controller to generate the regulated output voltage, the output filter circuit comprising an inductor and a third capacitor being a capacitor with a high equivalent series resistance (ESR).

14. The method of claim 13, wherein the third capacitor comprises a tantalum capacitor or an electrolytic capacitor.

15. The method of claim 12, further comprising:

coupling an output filter circuit to the switching regulator controller to generate the regulated output voltage, the output filter circuit comprising an inductor and a third capacitor being a capacitor with a low equivalent series resistance (ESR).

16. The method of claim 15, wherein the third capacitor comprises a ceramic capacitor.

17. The method of claim 15, wherein the capacitance of the second capacitor is selected in accordance with the inductance of the inductor and the capacitance of the third capacitor of the output filter circuit.

18. The method of claim 17, wherein when the inductance of the inductor and the capacitance of the third capacitor of the output filter circuit have large values, the capacitance of the second capacitor increases correspondingly to decrease the frequency of the second zero; and when the inductance of the inductor and the capacitance of the third capacitor of the output filter circuit have small values, the capacitance of the second capacitor decreases correspondingly to increase the frequency of the second zero.

19. The method of claim 12, further comprising:
coupling a fourth resistor in parallel with the second capacitor to increase the gain of the closed loop feedback system.

20. The method of claim 12, further comprising:
coupling a fourth capacitor and a fourth resistor, connected in series, in parallel with the second capacitor to increase the gain of the closed loop feedback system at a frequency determined by the capacitance of the fourth capacitor and the resistance of the fourth resistor.

* * * * *